(12) United States Patent
Armitage et al.

(10) Patent No.: US 9,082,308 B2
(45) Date of Patent: Jul. 14, 2015

(54) DRIVER PERFORMANCE ANALYSIS AND CONSEQUENCE

(71) Applicant: Cartasite Inc., Denver, CO (US)

(72) Inventors: David L. Armitage, Golden, CO (US); Gregory Froim Kushnir, Denver, CO (US); Mark Alvin Mason, Thornton, CO (US)

(73) Assignee: Cartasite Inc., Denver, CO (US)

( * ) Notice: Subject to any disclaimer, the term of this patent is extended or adjusted under 35 U.S.C. 154(b) by 0 days.

(21) Appl. No.: 14/100,933

(22) Filed: Dec. 9, 2013

(65) Prior Publication Data

US 2014/0099607 A1 Apr. 10, 2014

Related U.S. Application Data

(63) Continuation-in-part of application No. 12/902,087, filed on Oct. 11, 2010, now Pat. No. 8,604,920.

(60) Provisional application No. 61/253,333, filed on Oct. 20, 2009.

(51) Int. Cl.

| | |
|---|---|
| B60R 16/02 | (2006.01) |
| G09B 5/00 | (2006.01) |
| B60R 16/023 | (2006.01) |
| B60W 40/09 | (2012.01) |
| G07C 5/00 | (2006.01) |
| G09B 19/16 | (2006.01) |
| G07C 5/08 | (2006.01) |
| G06Q 10/06 | (2012.01) |

(52) U.S. Cl.
CPC ............. *G09B 5/00* (2013.01); *B60R 16/0236* (2013.01); *B60W 40/09* (2013.01); *G06Q 10/06398* (2013.01); *G07C 5/008* (2013.01); *G07C 5/0816* (2013.01); *G09B 19/167* (2013.01); *B60K 2350/1092* (2013.01); *B60W 2520/10* (2013.01); *B60W 2520/105* (2013.01); *G07C 5/085* (2013.01)

(58) Field of Classification Search
CPC .................................................. B60R 16/0236
USPC .......... 340/438, 439, 425.5, 461, 576; 701/29, 701/35

See application file for complete search history.

(56) References Cited

U.S. PATENT DOCUMENTS

| | | | | |
|---|---|---|---|---|
| 5,394,136 | A | * 2/1995 | Lammers et al. | 340/439 |
| 8,604,920 | B2 | * 12/2013 | Armitage et al. | 340/439 |
| 2004/0236476 | A1 | 11/2004 | Chowdhary | |
| 2006/0112103 | A1 | * 5/2006 | Besserman et al. | 707/10 |
| 2007/0001831 | A1 | * 1/2007 | Raz et al. | 340/439 |
| 2008/0255722 | A1 | * 10/2008 | McClellan et al. | 701/35 |
| 2010/0300586 | A1 | * 12/2010 | Poloni et al. | 705/4 |
| 2011/0012720 | A1 | * 1/2011 | Hirschfeld | 340/439 |
| 2011/0063099 | A1 | 3/2011 | Miller et al. | |
| 2012/0044063 | A1 | 2/2012 | McClellan et al. | |

* cited by examiner

*Primary Examiner* — Brent Swarthout
(74) *Attorney, Agent, or Firm* — Thomas A. Dougherty (57) ABSTRACT

Methods, systems, and software are disclosed for operating a driver analysis system, including receiving vehicle operation data corresponding to operation of vehicles by drivers, identifying a peer group associated with a target driver, processing at least a portion of the vehicle operation data to determine driving performance of the target driver relative to driving performance of the peer group, generating a driving report which identifies the driving performance of the target driver, and transferring the driving report to a target device for viewing by the target driver and a member of the justice system.

18 Claims, 8 Drawing Sheets

DRIVER PERFORMANCE ANALYSIS AND CONSEQUENCE

RELATED APPLICATIONS

This application is related to and is a continuation in part application of, and claims priority to, U.S. patent application Ser. No. 12/902,087 filed Oct. 11, 2010 entitled "SYSTEMS AND METHODS FOR VEHICLE PERFORMANCE ANALYSIS AND PRESENTATION," which claims priority to U.S. Provisional Patent Application No. 61/253,333, entitled "Systems and Methods for Vehicle Performance Analysis and Presentation" filed on Oct. 20, 2009, which are both hereby incorporated by reference in their entirety.

TECHNICAL BACKGROUND

Performance monitoring tools are commonly used to assess the operation of a vehicle, such as an automobile, airplane, or the like. Such tools analyze the performance of the vehicle and the various internal systems which make up the vehicle. In addition, the monitoring systems may assess the behavior of the driver operating the vehicle and gather data information pertaining to how that person is operating the vehicle. These assessments may be achieved in both real time and non-real time manners.

Most newer cars and trucks contain On Board Diagnostics (OBD) systems which provide some level of self-diagnostic and information reporting capability. OBD systems were originally developed to be used during the manufacturing and test processes. However, the capabilities of these systems and their uses have expanded dramatically since that time. Currently, OBD systems give repair technicians, vehicle owners, and emissions testing agencies electronic access to state of health and operational information pertaining to many different vehicle subsystems. Historically, many vehicle functions like braking, speed indication, and fuel delivery were performed by mechanical systems and components. Presently, many of these vehicle functions are controlled or monitored through electronic means, thereby making electronic information about the performance and operations of those systems readily available. It is now possible to electronically monitor tens, if not hundreds, of operational characteristics of a vehicle using OBD systems, as well as power devices from the OBD port.

Driver behavior and the potential for vehicle accidents has been a longstanding concern. In recent years, driver behavior has garnered additional attention in various media outlets. In particular, some media have reported on the impact of new communication technologies, such as cell phones and text messaging, on driver behavior. It has been shown that engaging with these technologies while operating a vehicle can have significant adverse effects. Consequently, business owners and government agencies that have drivers operating vehicles on their behalf have heightened concerns about the driving behaviors of their drivers and the ensuing risks which may be associated with those behaviors. Parents may be concerned about the driving behaviors of their children and wish to affect those driving behaviors for similar reasons.

In addition to affecting the risks of an accident, driver behavior may have other important cost and environmental impacts as well. For example, rapid or frequent acceleration of a vehicle may result in less efficient fuel consumption or higher concentrations of pollutants. In addition, hard braking or excessive speed may result in increased maintenance costs, unexpected repair costs, or require premature vehicle replacement.

Law enforcement and the justice system may have difficulty monitoring individuals with driving infractions. Modification of the driving behaviors of a driver with past infraction(s) may be a goal of the justice system.

Overview

In various embodiments, systems and methods are disclosed for operating a driver analysis system to analyze driver behavior and providing a presentation of the analyzed information to a driver and a third party, such as a person in, or a portion of, the justice system. Based at least in part on the information, the justice system may choose to expunge an infraction or enhance penalties of the driver. The justice system may include a court, officer, judge, attorney, probation officer, etc.

In an embodiment, a method of operating a driver analysis system comprises receiving vehicle operation data corresponding to operation of a plurality of vehicles operated by a plurality of drivers, generating a driving report which identifies the driving performance of the target driver, and transferring the driving report to a target device for viewing by one or more parties, where the one or more parties comprises an entity related to the justice system.

In another embodiment, a driver analysis system comprises a communication interface configured to receive vehicle operation data corresponding to operation of a one or more of vehicles operated by one or more drivers, a processing system configured to identify from the plurality of drivers a peer group associated with a target driver, process at least a portion of the vehicle operation data to determine driving performance of the target driver relative to driving performance of the peer group, and generate a driving score which generally identifies the driving performance of the target driver, the communication interface further configured to transfer the driving score to an entity comprising at least a portion of the justice system.

In another example embodiment, an example driver analysis network comprises a plurality of monitoring systems located on board a plurality of vehicles operated by a plurality of drivers wherein the plurality of monitoring systems is configured to transmit vehicle operation data corresponding to operation of the plurality of vehicles, a server configured to receive the vehicle operation data at a communication interface, identify from the plurality of drivers a peer group associated with a target driver, process at least a portion of the vehicle operation data to determine driving performance of the target driver relative to driving performance of the peer group, generate a driving report which identifies the driving performance of the target driver, and transmit the driving report at the communication interface, a target device configured to receive the driving report and display the driving report for viewing by the target driver and a member of the justice system.

In another example embodiment, the monitoring systems which gather vehicle operation data are powered through an OBD port on each vehicle. The monitoring systems gather some of the vehicle operation data from the OBD port and gather other vehicle operation data from a source other than the OBD port. The monitoring systems may also include includes an accelerometer, GPS functionality, flash memory, a processor, a real-time operating system, as well as cellular and Bluetooth-type communication capabilities.

DETAILED DESCRIPTION

FIGS. 1-8 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments and variations of the invention. As a result, the invention is not limited to the specific embodiments described below, but only by the claims and their equivalents.

The possibility of accidents is always a concern when operating a motor vehicle. Accidents can cause injuries, property damage, financial loss, and business disruption. Studies have shown that increased use of mobile phones, texting, and other electronic device use by drivers increases these risks. Business owners have a vested interest in making sure their drivers are exercising careful and responsible vehicle operation. Parents have similar concerns with respect to their children.

In addition to increasing the risks of accident or injury, aggressive or irresponsible driver behavior can have other adverse affects. Excessive acceleration and excessive speed can result in increased fuel costs, increased emission of pollutants, and premature vehicle wear. Similarly, frequent hard braking events may be an indicator that the vehicle is being operated in a manner which increases costs or the risk of accidents. In addition to causing premature wear, increased maintenance costs, and increased fuel costs, these behaviors may also lead to a shortened vehicle life and result in a need for premature replacement of the vehicle.

For the reasons discussed above, it is desirable to gather vehicle operation data in order to monitor driver behavior as well as to formulate metrics which can be used to facilitate improvements. Because no driver is perfect and because circumstances will always require drivers to occasionally brake hard, accelerate quickly or engage in other similar driving behaviors, it is desirable to perform a comparison to other drivers in similar circumstances to best identify realistic objectives and target areas for improvement. There are many variables which affect operational behavior like driver experience, vehicle type, driving environment, and geographical variations, as well as others. Therefore, driver behavior metrics are most meaningful and most fairly applied when a driver is compared to other peer drivers who are operating under the challenges of similar conditions.

Rather than simply punish drivers who exceed certain predefined thresholds, it is beneficial to provide drivers ongoing information about their driving performance and how that driving performance compares to the performance of the driver's peers. This constructive feedback gives the driver sufficient information to manage his or her driving behaviors in a proactive manner and understand his or her performance relative to peers or other groups. It gives the driver an opportunity to make improvements and see the results of those improvements. Providing the information in a historical format allows drivers to track their improvements over time.

Since driving conditions vary, incremental improvement of every driving behavior metric during every time period may not be realistic and some undulation is expected. For this reason, it is desirable to also determine an overall driving score which summarizes the driver's overall performance for the time period in the form of a single performance score. By implementing a driver analysis system which provides this information directly to drivers and other entities in a concise and summarized graphical format, many drivers may be encouraged or motivated to make improvements and will have the information to track their progress without the involvement of or pressure from their management or the judicial system.

The driver may also be motivated by a modification of a penalty. The penalty may include a speeding ticket, or other legal infraction the driver has been arrested for. The modification may be the reduction of a penalty, such as expunging a citation or arrest, reducing points for the citation, etc. The modification may also be to increase the penalty, such as an increased fine or incarceration, among others.

Figure 1:
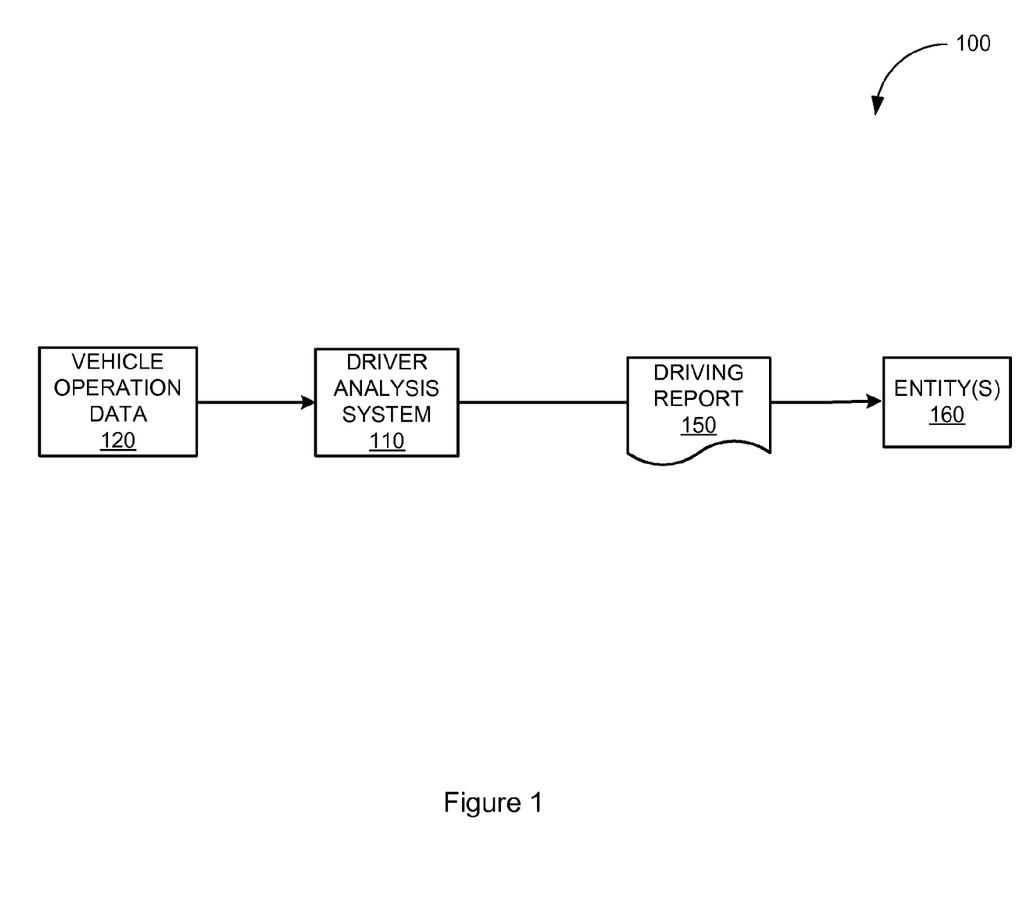
FIG. 1 illustrates a driving report system.

FIG. 1 illustrates driving report system 100. Driving report system 100 comprises driver analysis system 110 which receives vehicle operation data 120 from multiple vehicles. Driver analysis system 110 uses this data to generate driving report 150 which is delivered to entity (s) 160.

The entity(s) 160 may include the target driver, and/or an entity in the justice or law enforcement communities. This may include a court, judge, police officer, clerk, attorney, probation officer, etc. This may increase the likelihood of behavior modification of drivers who habitually drive aggressively, reduce the likelihood of repeat offenders, and generally increase the likelihood of safer driving and a safer community.

The report may be used to adjust or modify penalties assessed by the judicial system. If the driving score is better than a predetermined level for a period of time, a speeding citation may be dismissed or expunged, points on the driver's record reduced, or other positive modification. This may save the driver the amount of the ticket and/or increase insurance premiums, or points on the driver's record, which may motivate the driver to change driving behaviors.

If the driving score is below a certain level and/or the driver breaks the law again, the penalty may be reinstituted or increased. The penalty increase may include a larger fine, revocation of the driver's license, incarceration, increase the points on the driver's record, or other punitive measures, etc.

The period of time may be 60 days for a first non-serious offence, or longer for more serious offenses or for subsequent offences. The cost may be paid for by the driver.

Figure 2:
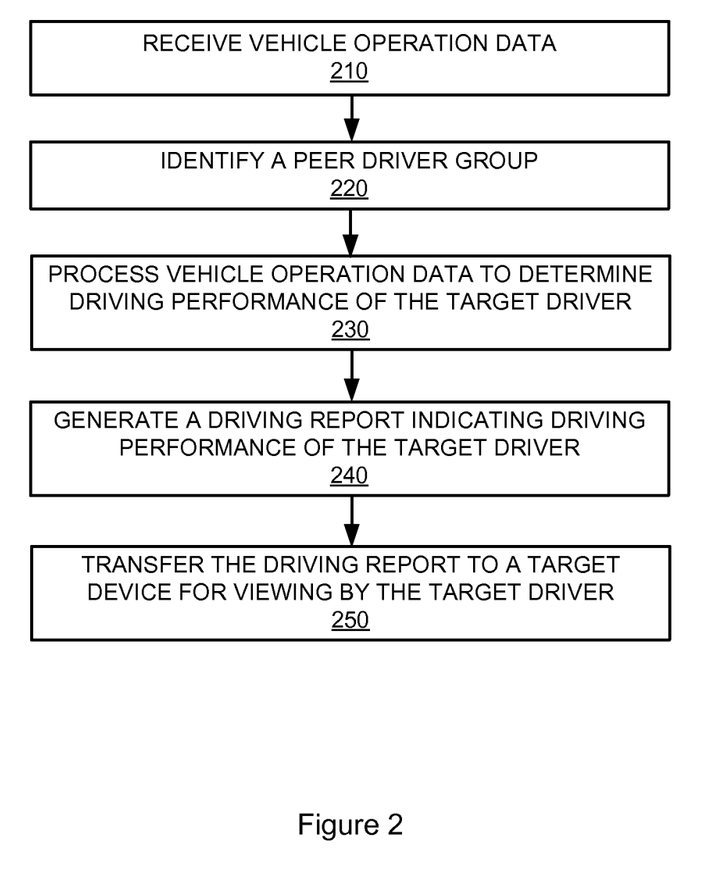
FIG. 2 illustrates the operation of a driving report system.

FIG. 2 is a flow chart illustrating a method of operating driving report system 100. Driver analysis system 110 receives vehicle operation data 120 which is collected from multiple vehicles driven by different drivers (step 210). Driver analysis system 110 may optionally identify a peer group of drivers associated with the driver of interest, target driver 160 (step 220). Next, driver analysis system 110 optionally processes the vehicle operation data to determine the driving performance of target driver 160 relative to the driving performance of the peer group (step 230). Based at least in part on the results of this comparison, driver analysis system 110 generates driving report 150 which identifies the driving performance of the target driver (step 240) and transfers driving report 150 to a target device for viewing by entity(s) 160 (step 250). The report includes the driver's performance in at least one category and indicates how that performance compares to that of the peer group, as well as an overall driving score.

Figure 3:
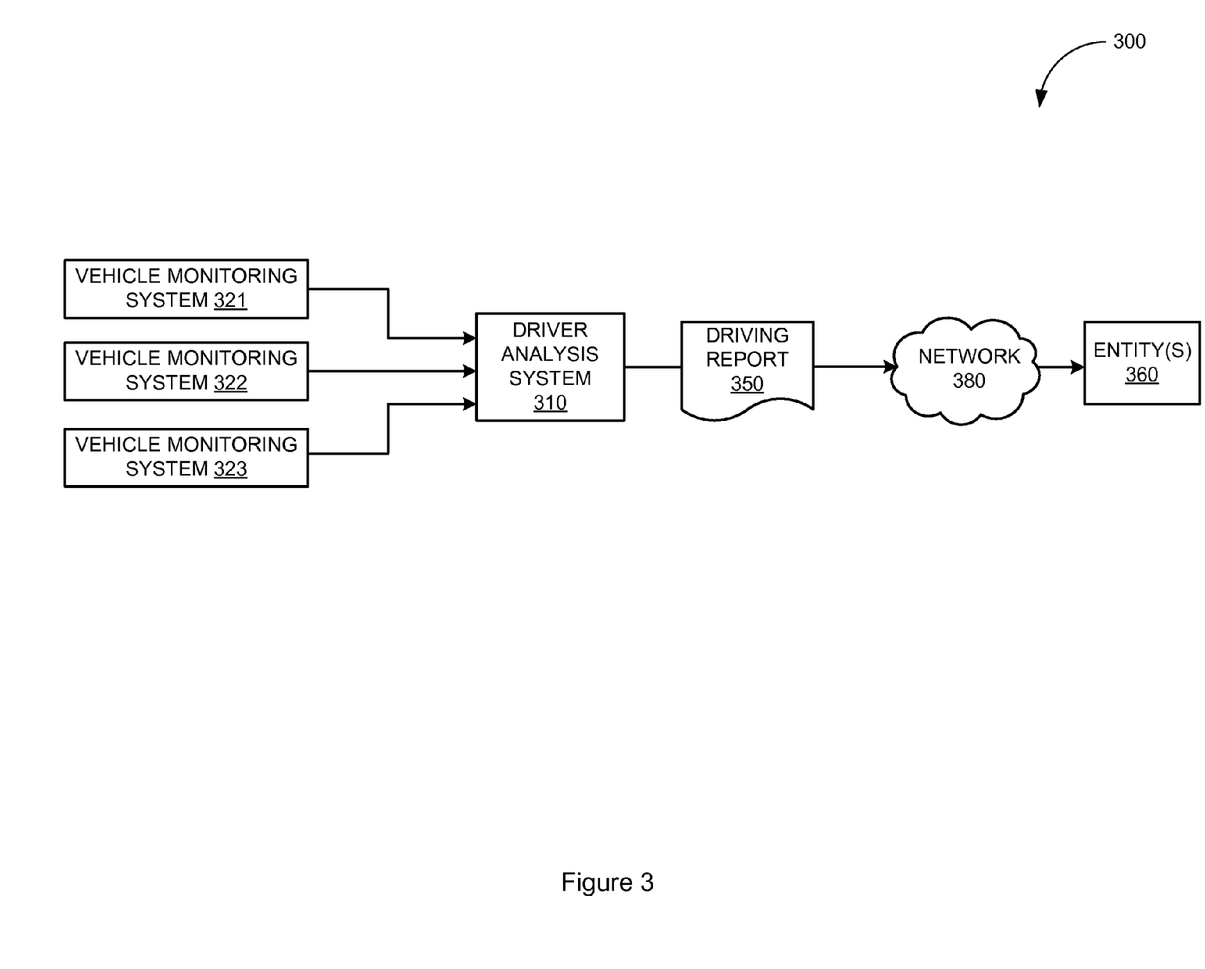
FIG. 3 illustrates a driving report system.

FIG. 3 illustrates driving report system 300. Driving report system 300 comprises a driver analysis system 310 which receives vehicle operation data from vehicle monitoring systems 321-323 and uses this data to generate a driving report 350 which is delivered to one or more entities 360, such as the target driver and an entity in the justice or, penal, and/or law enforcement systems.

In FIG. 3, driver analysis system 310 receives vehicle operation data from vehicle monitoring systems 321-323. Vehicle monitoring systems 321-323 are electronic devices which are on board each individual vehicle and collect data about the operation of the vehicle over a period of time. The data includes information about how the vehicle is being used and the driver's operational behavior characteristics.

Periodically, each of the vehicle monitoring systems 321-323 transfers this data to driver analysis system 310. The vehicle operation data may include data describing acceleration, speed, braking, lateral acceleration, fuel consumption, emissions, location, driving hours, maintenance, as well as potentially many other types of vehicle diagnostics and information about how the vehicle is being operated.

Vehicle monitoring devices or systems 321-323 could also comprise a global positioning system (GPS) receiver, to receive and interpret signals from positioning satellites to determine geographic coordinates. In an example, vehicle monitoring systems 321-323 include an accelerometer, GPS functionality, flash memory, a processor, a real-time operating system, as well as cellular and Bluetooth-type communication capabilities.

Upon receipt of the vehicle operation data from one or more vehicles 321-323, driver analysis system 310 begins the process of generating a driving report for a particular driver, target driver 360. In order to analyze the operation data and provide meaningful and valid comparisons for target driver 360, driver analysis system 310 identifies a "peer" group of drivers associated with target driver 360. This "peer" group may be determined based on selecting other drivers who drive similar types of vehicles, have similar driving assignments, have similar levels of experience, drive in similar geographic areas, or other factors which suggest useful comparisons.

Driver analysis system 310 may then process the vehicle operation data to determine driving performance of target driver 360 relative to driving performance of the selected peer group based upon the various types of operation data gathered. One example is hard braking events. Through the course of operation, vehicle monitoring systems 321-323 gather data each time the braking force applied to a vehicle exceeds a threshold. These thresholds may be set quite low so as to capture events that are minor in nature. Relatively insignificant events may be useful in characterizing patterns of behavior. While these minor events will happen occasionally with all drivers because unexpected situations do occur, a higher rate of these events may suggest excessive speed, following other vehicles closely, distracted driving, or other undesirable behaviors.

In this example, driver analysis system 310 determines the rate of occurrence of hard braking events for all drivers in the peer driver group. For example, this may be determined as a rate—an average number of hard braking events for each hour of driving. Alternatively, it may be determined as an absolute figure for a fixed time period—a number of hard braking events per week. Driver analysis system 310 then determines the rate of occurrence for target driver 360 in the same manner. The performance of target driver 360 is compared to the average for the peer group and may also be compared to other characteristics of the peer group including, but not limited to, minimum, maximum, best, and worst. Those skilled in the art will recognize there are many other operational and behavioral parameters which may be analyzed and many types of statistical analysis which may be performed on the data. The invention is not limited to the specific examples provided above.

Based on the results of the analysis, driver analysis system 310 generates driving report 350 which identifies the driving performance of the target driver and includes a comparison to the peer group. Driver analysis system 310 transfers driving report 350 to a target device for viewing by one or more entities. The entities may include the target driver 360 and other entities. The entities 360 receive the driving report 350 possibly over internet or other communication system 380 and view it on a target device.

The target device may include a paper report, a personal computer, mobile phone, mobile internet terminal, or other type of electronic communication device. Driving report 350 may be transmitted in the form of regular mail, an email, text message, or displayed on a web page. Driving report 350 may also be incorporated into a software document, such as a MS Word file, a PDF file, a Power Point file, or the like. In yet another example, the analysis may be provided in a video format and played-out to the user. An audio presentation of the analysis may also be possible, such as by way of a voice-mail message, a phone recording, or the like.

Figure 4:
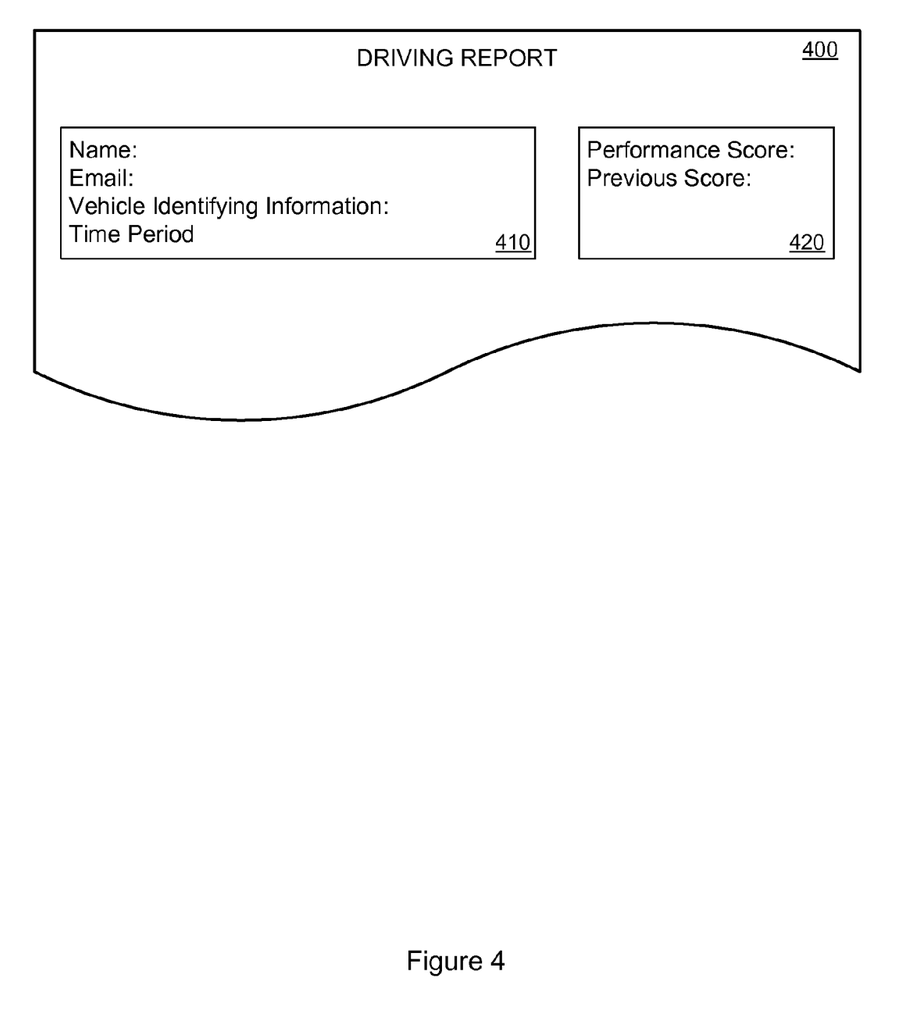
FIG. 4 illustrates a driving report.

FIG. 4 illustrates an example driving report. In information block 410, driving report 400 includes information identifying the driver, the driver's email address, the vehicle driven, and the time period to which the report applies. Additional information may be included to identify the vehicle including make, model, license plate number, or other identifying information. Block 420 includes the driver's safety or performance score for the current period as well as the previous safety or performance score. This score is a combined score which represents an overall score based on the various individual categories of operation characteristics, if more than one, which are reported and considered. Driving report 400 may also include multiple previous performance scores enabling the driver to easily see the performance trend over time relative to other drivers.

In an example, a safety score of 85 or above may indicate that the driver is driving better than average. This may be used to modify (decrease) the penalty the driver is facing. A safety score of less than 85 may indicate that the driver is driving worse than average. This score may be used to reinstate the penalty or increase the penalty.

Figure 5:
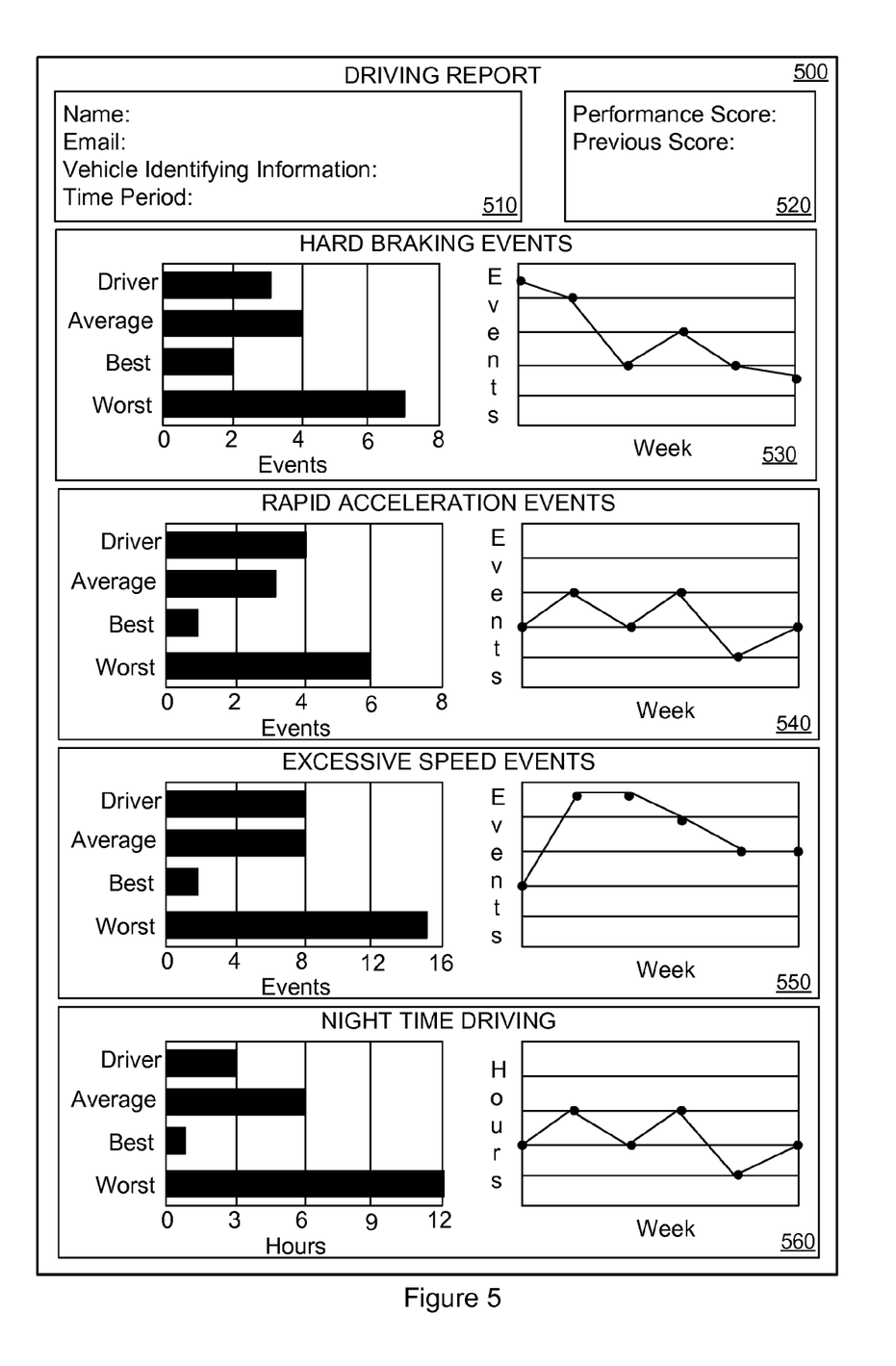
FIG. 5 illustrates a driving report.

FIG. 5 illustrates an example of another driving report. In information block 510, driving report 500 includes information identifying the driver, the driver's email address, the vehicle driven, and the time period to which the report applies. Additional information may be included to identify the vehicle including make, model, license plate number, or other identifying information. If the driver drove multiple vehicles during the time period, each vehicle could be listed and the consolidated information could be included on driving report 500.

Block 520 of driving report 500 includes the driver's performance score for the current period as well as the previous performance score. The performance score is a combined score which represents an overall score based on the various individual categories of specific behaviors which are reported and considered. Driving report 500 may also include multiple previous performance scores such that the driver can easily see the performance trend over time relative to other drivers.

In addition, driving report 500 includes detailed reporting information on specific operational characteristics in blocks 530-560. Block 530 includes information on hard braking events for the target driver. The number of hard braking events the target driver had in the reporting period is compared to the average for the peer group as well as to the drivers in the peer group who had the best and worst performance for the time period as measured by number of events. Rather than absolute quantity, the comparison could be based on a rate such as hard breaking events per hour, per week, or per hundred miles driven. Block 520 also includes a historical graphical representation illustrating the driver's hard braking event performance trend over time. Blocks 540, 550, and 560 provide similar illustrations of reporting information for rapid acceleration events, excessive speed events, and number of night time driving hours.

Blocks 530-560 may also be used to modify the penalty of the driver. Lower than average events may be used to modify or expunge the citation, while worse than average behavior could be used to increase or reinstate the penalty.

Those skilled in the art will recognize there are many other operational and behavioral parameters which may be analyzed and included in driving report 500. There are also many types of statistical analysis which may be performed on the data. The resulting driving information may be graphically presented and displayed in many different ways. The invention is not limited to the specific examples and methods of presentation provided in FIG. 5.

In addition to periodic driver reports, immediate alerts may be generated and provided as well. For example, if a number of hard braking events are detected beyond a threshold, the user may be provided with an alert describing this driving behavior. Such an immediate alert may result in a reduction in hard braking events, thereby increasing safety. The alerts may be provided in real-time, but may also be provided some time later after the events are detected.

Figure 6:
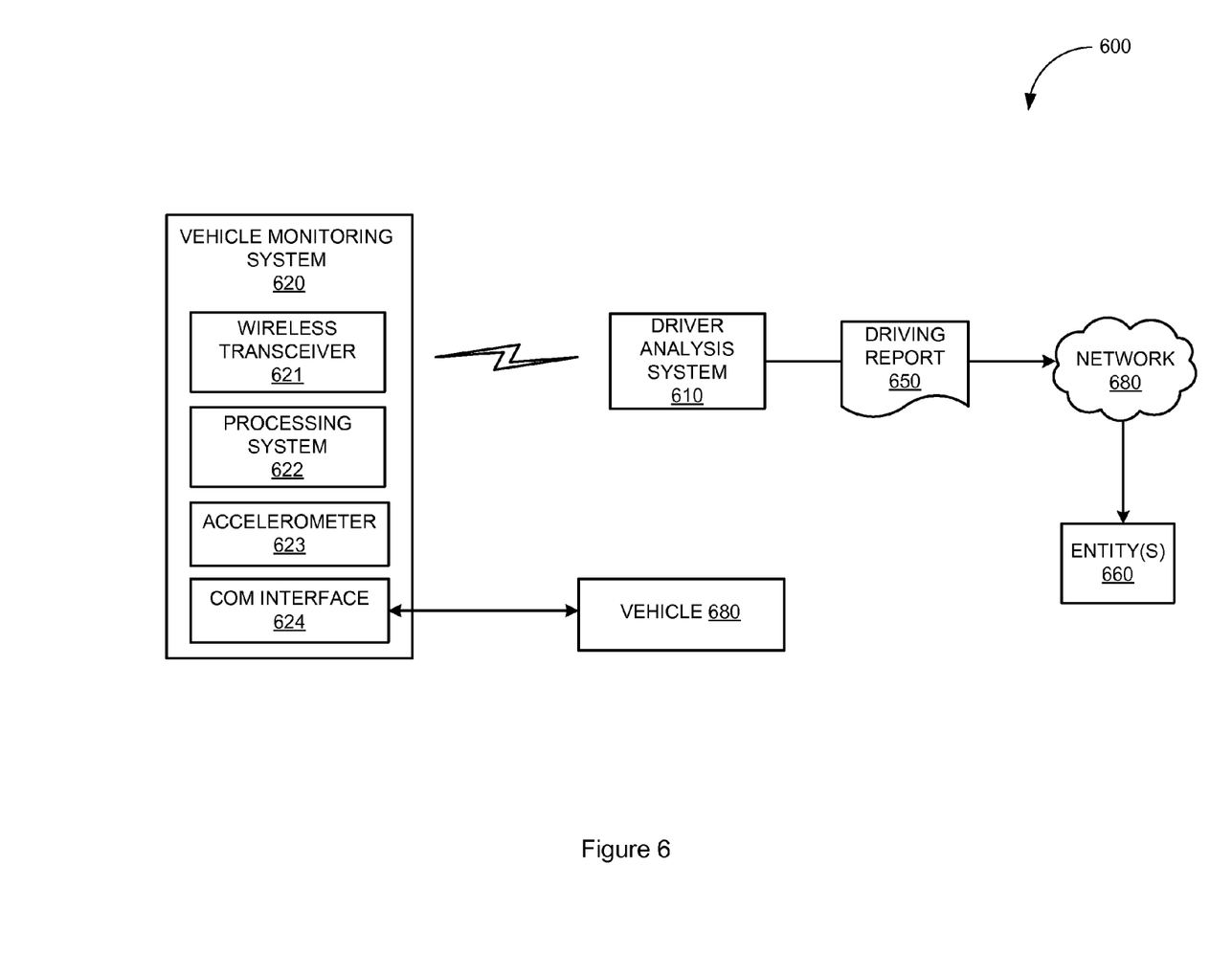
FIG. 6 illustrates a driving report system.

FIG. 6 illustrates driving report system 600. Driving report system 600 comprises a driver analysis system which receives vehicle operation data from vehicle monitoring system through a wireless connection and uses this data to generate a driving report which is delivered to a target driver over the internet.

In FIG. 6, driver analysis system 610 receives vehicle operation data from multiple vehicle monitoring system similar to that illustrated by vehicle monitoring system 620. Vehicle monitoring system 620 is an electronic device which is generally adjacent or coupled to vehicle 680 and collects data regarding the operation of the vehicle 680 over a period of time. Vehicle monitoring system 620 interfaces to and collects data from vehicle 680 through a connection between On Board Diagnostic (OBD) interface 624 and OBD port 681. The OBD port is a standardized interface which allows vehicle monitoring system 620 to capture many different types of data from vehicle 680's electronic and engine management systems. Vehicle monitoring system 620 could also use and transmit information from a smartphone of an occupant of the vehicle, or from a GPS system associated with the vehicle.

In addition to the operational data gathered through OBD port 681, vehicle monitoring system 620 gathers operational data from other sources as well. In one example, vehicle monitoring system 620 contains accelerometer 620 which is used to keep track of the location and speed of vehicle 680. This location and speed information may also be combined with the other operational data gathered. Vehicle monitoring system 620 may gather location and speed information from other devices such as a global position system (GPS) receiver. In addition, vehicle monitoring system 620 may collect vehicle operation data from other sensors or sources which are neither part of vehicle monitoring system 620 nor vehicle 680, such as a personal communication device, such as a smartphone.

Vehicle monitoring system 620 could also include a global positioning system (GPS) receiver, to receive and interpret signals from positioning satellites to determine geographic coordinates. In an example, vehicle monitor 620 includes an accelerometer, GPS functionality, flash memory, a processor, a real-time operating system, as well as cellular and Bluetooth-type communication capabilities.

Processing system 622 in vehicle monitoring system 620 receives, processes, and stores all of the gathered vehicle operation data such that it can be transmitted at the appropriate time. Vehicle monitoring system 620 uses wireless transceiver 621 to transmit the set of vehicle operation data to driver analysis system 610. This process may be performed frequently or may be performed only once each reporting period. The transmission may be initiated by either vehicle monitoring system 620 or by driver analysis system 610. The vehicle operation data may include data describing acceleration, speed, braking, fuel consumption, location, driving hours, maintenance, as well as potentially many other measures of driver behavior, vehicle operation data, and vehicle diagnostics.

After driver analysis system 610 receives data for multiple drivers or vehicles, it begins the process of generating a driving report for a particular driver, target driver 660 in this case. In order to analyze the operation data and provide meaningful and valid comparisons for target driver 660, driver analysis system 610 identifies a peer group of drivers associated with target driver 660. This peer group may be determined based on selecting other drivers who drive similar types of vehicles, have similar driving assignments, similar levels of experience, drive in similar geographic areas, or other factors which suggest useful comparisons. If a company wants to perform a broader benchmark comparison of its drivers to the drivers of other entities, the data may also be shared such that a peer group includes drivers which are employed by those other entities.

Next, driver analysis system 610 processes the vehicle operation data to determine driving performance of target driver 660 relative to driving performance of the selected peer group based upon various types of operation data gathered. One example is rapid acceleration events. Through the course of operation, vehicle monitoring system 620 gathers data each time the vehicle accelerates at a rate which exceeds an expected or predetermined threshold. This acceleration information may be gathered from the electronic systems of the vehicle as reported through OBD port 681 or may be gathered from accelerometer 623. While all drivers may have an occasional, legitimate need to accelerate rapidly, a higher rate of these events may suggest aggressive driving, excessive speed, or other undesirable driver behaviors.

In this example, driver analysis system 610 determines the rate of occurrence of rapid acceleration events for all drivers in the peer driver group. For instance, this may be determined as a rate or an average number of rapid acceleration events per time period of driving. Alternatively, it may be determined as an absolute figure for a fixed time period, the number of rapid acceleration events per week. Driver analysis system 610 then determines the occurrence of rapid acceleration events for target driver in the same manner. The performance of target driver is compared to the average for the peer group. Target driver's performance may also be compared to other characteristics of the peer group including, but not limited to, minimum, maximum, best, and worst. Those skilled in the art will recognize there are many other operational and behavioral parameters which may be analyzed and many types of statistical analysis which may be performed on the data. The invention is not limited to the specific examples provided above.

Based on the results of the analysis, driver analysis system 610 generates driving report 650 which identifies the driving performance of the target driver and comparisons to the peer group. Driver analysis system 610 transfers driving report 650 to one or more entities for viewing by sending it over network 680 or other means. Target driver 660 and other entities receive driving report 650 over network 680 through a target device and view the report on that device.

The target device may be paper, a personal computer, mobile phone, mobile internet terminal, or other type of electronic communication device. Driving report 650 may be transmitted in the form of mail, email, text message, or displayed on a web page. Driving report 650 may also be incorporated into a software document, such as a MS Word file, a PDF file, a Power Point file, or the like. In yet another example, the analysis may be provided in a video format and played-out to the user. An audio presentation of the analysis may also be possible, such as by way of a voicemail message, a phone recording, or the like.

Figure 7:
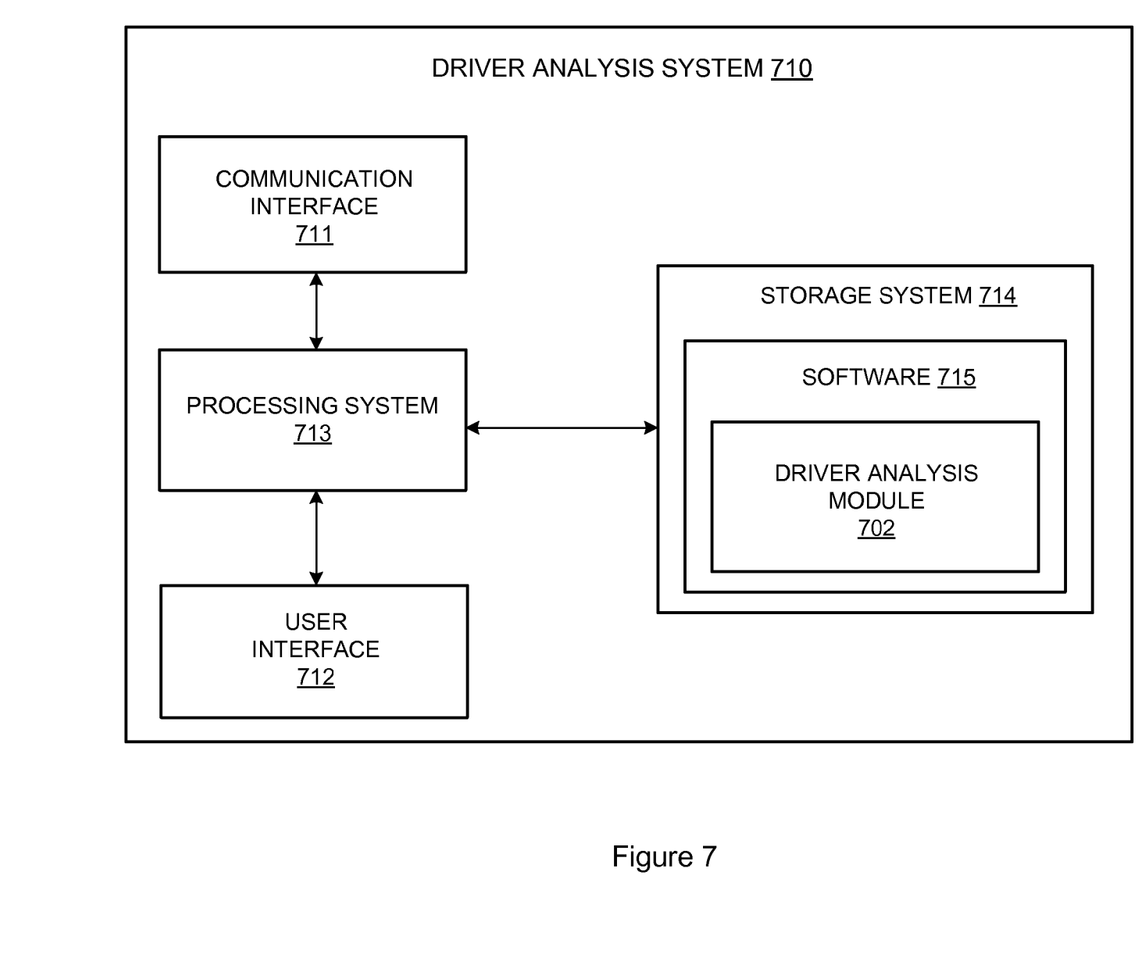
FIG. 7 illustrates a driving report system.

FIG. 7 illustrates driver analysis system 710 which is exemplary of the driver analysis systems in previous figures. Driver analysis system 710 is capable of receiving and processing vehicle performance data for a vehicle driven by a user. Driver analysis system 710 processes the performance data to generate an analysis of the driving behavior of the user. Driver analysis system 710 then provides a driving report one or more entities.

Driver analysis system 710 includes communication interface 711, user interface 712, processing system 713, storage system 714, and software 715. Software 715 includes driver analysis module 702. Processing system 713 is linked to communication interface 711 and 712. Software 715 is stored on storage system 714. In operation, processing system 713 executes software 715, including driver analysis module 702, to operate as described herein.

Communication interface 711 comprises a network card, network interface, port, or interface circuitry that allows storage system 714 to obtain vehicle performance data. Communication interface 711 may also include a memory device, software, processing circuitry, or some other communication device.

User interface 712 comprises components that interact with a user to receive user inputs and to present media and/or information. User interface 712 may include a speaker, microphone, buttons, lights, display screen, mouse, keyboard, or some other user input/output apparatus—including combinations thereof. User interface 712 may be omitted in some examples.

Processing system 713 may comprise a microprocessor and other circuitry that retrieves and executes software 715, including driver analysis module 702, from storage system 714. Storage system 714 comprises a disk drive, flash drive, data storage circuitry, or some other memory apparatus. Processing system 713 is typically mounted on a circuit board that may also contain storage system 714 and portions of communication interface 711 and user interface 712.

Software 715 comprises computer programs, firmware, or some other form of machine-readable processing instructions. Software 715 may include an operating system, utilities, drivers, network interfaces, applications, virtual machines, or some other type of software, such as driver analysis module 702. When executed by processing system 713, software 715 directs processing system 713 to operate as described herein.

In operation, driver analysis module 702, when executed by processing system 700, operates as follows. Driver analysis module 702 directs computer system 700 to obtain vehicle performance data for a vehicle driven by a user. For instance, via communication interface 711, computer system 700 may communicate with a system capable of providing vehicle performance data. It should be understood that computer system 700 may communicate remotely or directly with such an interface.

In another example, communication interface 711 may merely gather positioning and time information from a positioning system on-board a vehicle. A vehicle may contain a GPS unit capable of determining the vehicle's location, and/or other information from a smartphone. This location information can be communicated to communication interface 711. Using the position and time information gathered by communication interface 711, processing system 713 is able to derive performance information related to the performance and operation of the vehicle.

It should be understood that the analysis may be provided directly to the user by way of user interface 712, such as by displaying the analysis on a display screen. However, it should also be understood that the analysis may be provided, by way of communication interface 711, to a user device capable of presenting the analysis to the user.

Driver analysis system 710 may also be capable of determining a modification to a penalty, based at least in part on the driving report information.

Figure 8:
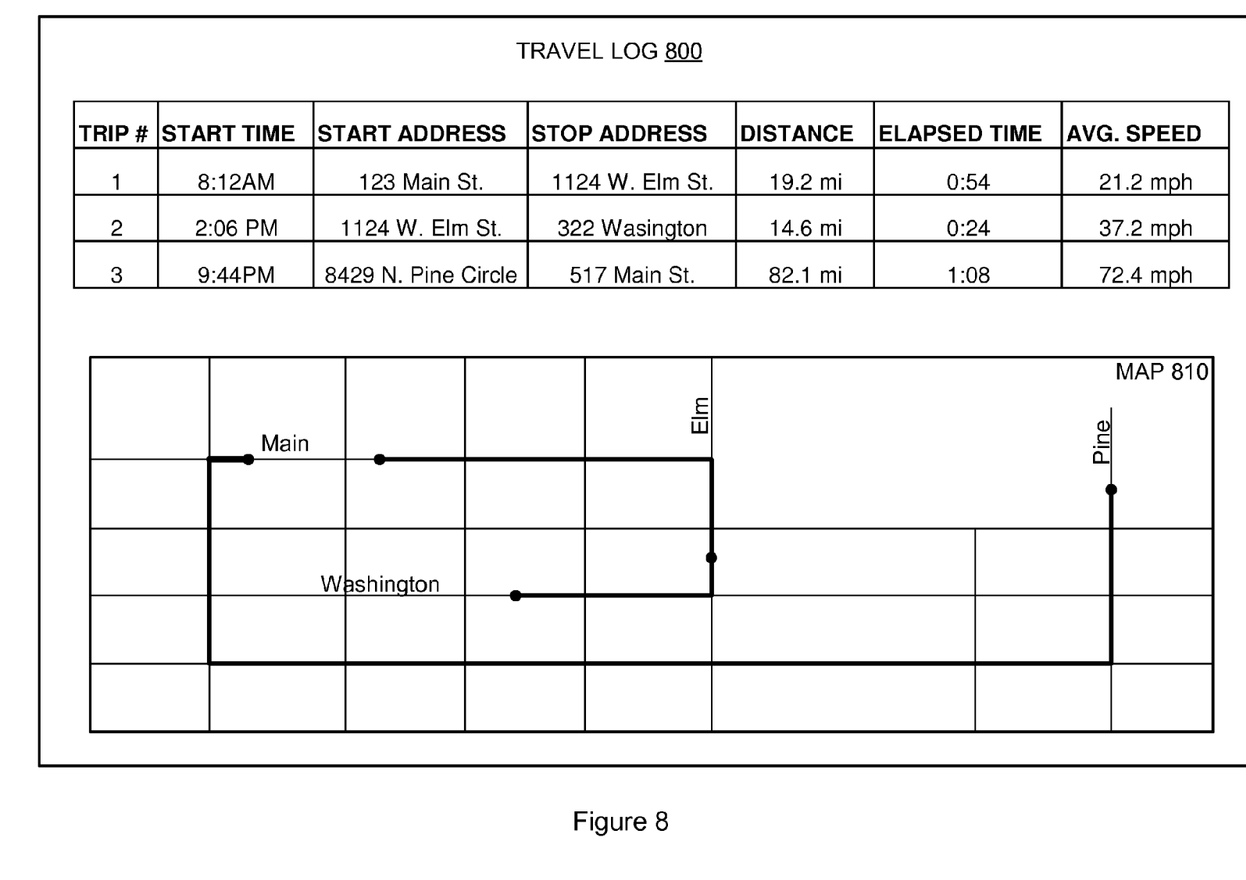
FIG. 8 illustrates the travel log portion of a driving report.

FIG. 8 illustrates travel log 800 which may be included in a driving report. Travel log 800 includes a detailed listing of trips made using the vehicle during the reporting period. The listing includes start time, start address, stop address, distance, elapsed time, and average speed for each trip. Other information describing the nature of each trip and the operational characteristics of the vehicle during that trip is also possible. Travel log 800 also includes map 810 which visually illustrates the route of each trip or trip segment on a map.

It should be understood that many advantages are provided by the systems and methods disclosed herein for analyzing driver performance and providing a presentation of the performance. Driver behavior can be altered via a feedback loop that does not distract the driver. This may be referred to as delayed feedback. While some past systems record incident behavior—such as at the moment of a crash—the disclosed systems and methods analyze behavior so as to reduce the occurrence of such incidents in the future. It can be shown that driving habits and behavior directly correlate to and are predictive of risk of collision or crash. Other patterns of behavior relate to inefficient fuel consumption, route determination, and excessive emissions. Thus, the disclosed systems and methods can reduce the occurrence of accidents, improve environmental factors, and reduce costs.

After extensive study of a large volume of drivers and reported events of various types, it has been determined that many aspects of driver behavior exhibit a 'log-normal' distribution. A log-normal distribution is a probability distribution of a random variable whose logarithm is normally distributed. Strategies for comparing and ranking drivers must take this into account. Linear normalization, histograms, and bell curves will not reveal critical differences in driver performance.

Log-normal distribution may increase the driver's confidence in the system in that it will show most drivers as "above average." Since most drivers consider themselves above average, it will reinforce that belief, and the driver's confidence in the report and system.

A driver analysis module, such as module 702 described above, may produce a scorecard that may provide three different perspectives on the behavior of a specific driver:

- log normal ranking of each driver against a population of other drivers for a given time interval for each metric gathered by the vehicle monitoring system,
- a trend of the absolute number of events for each metric over an extended period of time,
- an overall numeric score which weights various log normal ranking of metrics In one embodiment, the formula used for calculating a Combined Weighted Score is as follows.

Combined Weighted Score [CWS] is a mathematical calculation for a specific individual over a specific period of time compared with a specific peer group know as a SCOPE.

Each measured attribute (Hard Brakes, Rapid Starts, Overspeed, etc.) has an individual score [IS] associated with it for a given period of time related to a specific SCOPE.

Each IS has a weighted value [ISW] as it relates to that specific SCOPE. Different SCOPES may have different ISW values.

This allows each and any SCOPE to have its own subset of the Individual Scores and associated weighting in determining the Combined Weighted Score calculations.

Definitions

CWS.Scope(i)—Combined Weighted Score for all Individual Scores (i.e. attributes) participating in the calculations in the Scope(i)

CWS.Scope(i).Min=60 (Minimum score possible)
CWS.Scope(i).Max=100 (Maximum score possible)
IS(i,j)—Individual Score (j) for the Attribute(j) in the Scope(i)
ISW(i,j)—Individual Score Weight(j) for the Attribute(j) in the Scope(i). Units of measure: %

For each and any Scope(i) the following is always true:
SUM (ISW(i,j))=100%, where: j=1, m(i) AND m(i) is number of the Individual Scores participating in the Scope(i)

Combined Weighted Score Calculation $$CWS.Scope(i) = CWS.Scope(i).Min + (CWS.Scope(i).Max - CWS.Scope(i).Min) * (ISW(i,1)*IS(i,1) + ISW(i,2)*IS(i,2) + \ldots + ISW(i,m(i))*IS(i,m(i))) = CWS.Scope(i).Min + (CWS.Scope(i).Max - CWS.Scope(i).Min) * SUM(ISW(i,j)*IS(i,j))$$

Where: j=[1, m(i)] AND m(i) is number of the Individual Scores participating in the Scope(i).

Implementation:
In create/edit scope UI, there is a table with 2 columns.
1st column: Name of the attribute available in the scope
2nd column: Individual Score Weight (ISW(i,j))
The SUM (ISW(i,j))=100% has to be enforced
Default behavior:
Hard Brakes=25%
Rapid Starts=25%
Speeding=25%
Night Driving=0%
Idling=25%
Average MPG=0%
Hard Driving=0%

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a driver analysis system, the method comprising:
    receiving vehicle operation data corresponding to operation of a plurality of vehicles operated by a plurality of drivers;
    generating a driving report which identifies the driving performance of the target driver; and
    transferring the driving report to a target device for viewing by one or more parties,
    wherein the one or more parties comprises an entity related to the justice system,
    wherein a penalty comprising a legal driving infraction by the driver is modified based at least in part on the driving report.

2. The method of claim 1 further comprising:
    identifying from the plurality of drivers a peer group associated with a target driver; and
    processing at least a portion of the vehicle operation data to determine driving performance of the target driver relative to driving performance of the peer group.

3. The method of claim 1, wherein the penalty is reduced.

4. The method of claim 3, wherein the penalty comprises points on a driver record.

5. The method of claim 1, wherein the penalty is increased.

6. The method of claim 1, wherein the one or more parties further comprises the target driver.

7. The method of claim 1 wherein the vehicle operation data is received at a communication interface in the driver analysis system from a plurality of monitoring systems located generally adjacent the plurality of vehicles, and further comprising powering each of the plurality of monitoring systems from an On Board Diagnostic (OBD) port on each of the plurality of vehicles and gathering at least a portion of the vehicle operation data from a source other than from the vehicle via the OBD port.

8. The method of claim 7, wherein the source other than the OBD port comprises an accelerometer.

9. The method of claim 1, wherein the driving report comprises a safety score generally representing a level of safety of the driving performance of the target driver.

10. The method of claim 1, further comprising generating a plurality of graphical representations of the driving performance of the target driver relative to the driving performance of the peer group.

11. The method of claim 10, wherein a first graphical representation of the plurality of graphical representations comprises hard braking events.

12. The method of claim 10, wherein a second graphical representation of the plurality of graphical representations comprises rapid acceleration events.

13. The method of claim 10, wherein a third graphical representation of the plurality of graphical representations comprises excessive speed events.

14. A driver analysis system comprising:
    a communication interface configured to receive vehicle operation data corresponding to operation of a one or more of vehicles operated by one or more drivers;
    a processing system configured to identify from the plurality of drivers a peer group associated with a target driver, process at least a portion of the vehicle operation data to determine driving performance of the target driver relative to driving performance of the peer group, and generate a driving score which generally identifies the driving performance of the target driver;

the communication interface further configured to transfer the driving score to an entity comprising an entity of the justice system,
wherein the processing system is further configured to determine a modification of a penalty comprising a legal driving infraction by the driver, based at least in part on the driving score.

15. The driver analysis system of claim 14, further comprising a plurality of monitoring systems located generally adjacent the plurality of vehicles wherein the communication interface is capable of receiving the vehicle operation data from the plurality of monitoring systems.

16. The driver analysis system of claim 15, wherein each of the plurality of monitoring systems is powered from an On Board Diagnostic (OBD) port on each of the plurality of vehicles and gathers at least a portion of the vehicle operation data from a source other than the OBD port.

17. The driver analysis system of claim 16, wherein the source other than the OBD port comprises at least one of an accelerometer, memory, blue-tooth communication capabilities, wireless communication capabilities, and a real-time operating system.

18. A driver analysis network comprising:
a plurality of monitoring systems located on board a plurality of vehicles operated by a plurality of drivers wherein the plurality of monitoring systems is configured to transmit vehicle operation data corresponding to operation of the plurality of vehicles;
a server configured to receive the vehicle operation data at a communication interface, identify from the plurality of drivers a peer group associated with a target driver, process at least a portion of the vehicle operation data to determine driving performance of the target driver relative to driving performance of the peer group, generate a driving report which identifies the driving performance of the target driver, and transmit the driving report at the communication interface;
a target device configured to receive the driving report and display the driving report for viewing by the target driver and a member of the justice system, wherein a penalty comprising a legal driving infraction by the driver is modified based at least in part on the driving report.

* * * * *